United States Patent [19]

Uwira et al.

[11] Patent Number: 4,633,317
[45] Date of Patent: Dec. 30, 1986

[54] ELECTRO-OPTICAL DETECTOR SYSTEM

[75] Inventors: Bernd Uwira, Constance; Hans Kordulla, Singen; Johann-Friedrich Egger, Überlingen, all of Fed. Rep. of Germany

[73] Assignee: Bodenseewerk Gerätetechnic GmbH, Überlingen, Fed. Rep. of Germany

[21] Appl. No.: 624,619

[22] Filed: Jun. 26, 1984

[30] Foreign Application Priority Data

Jul. 2, 1983 [DE] Fed. Rep. of Germany ....... 3323956

[51] Int. Cl.[4] .............................................. H01J 3/11
[52] U.S. Cl. .................................... 358/213; 358/225
[58] Field of Search ............... 358/213, 209, 217, 212; 382/66; 250/578

[56] References Cited

U.S. PATENT DOCUMENTS 4,315,284  2/1982  Stillwell et al. ..................... 358/209
4,543,601  9/1985  Harada et al. ...................... 358/213

FOREIGN PATENT DOCUMENTS 53-101939  9/1978  Japan ................................. 358/212

Primary Examiner—Robert G. Lev
Attorney, Agent, or Firm—Lee, Smith & Zickert

[57] ABSTRACT

A high resolution electro-optical detector system having a mosaic detector as charge-coupled component is to be provided. The image of the field of can may be periodically displaced along a closed trajectory to cover the interstices between the detector elements of the mosaic detector. The image informations thus obtained consecutively are stored, and an electronic image of high resolution is obtained therefrom for the digital image processing. Different constructions of the image offset means are described.

5 Claims, 10 Drawing Figures

ELECTRO-OPTICAL DETECTOR SYSTEM

The invention relates to an electro-optical detector system, comprising
(a) a mosaic detector having a two-dimensional arrangement of detector elements arranged with interstices therebetween.
(b) an imaging optical system adapted to image a field of view on the mosaic detector.

The invention relates in particular to the generation of electronic image contents for the digital image processing. Charge-coupled components having a two-dimentional arrangement of detector elements are known in the prior art as mosaic detectors. The detector elements are arranged in lines and columns. Interstices are formed between the lines and the columns for technological reasons. These interstices cause considerable loss of information.

It is the object of the invention to reduce the losses of information due to the interstices between the detector elements, in an electro-optical scanning system of the type mentioned above.

According to the invention this object is achieved by
(c) image offset means adapted to periodically displace the image of the field of view along a closed trajectory relative to the mosaic detector for covering the interstices,
(d) memory means, to which image informations can be applied, which image informations are supplied by the detector elements and correspond to several different points or parts of the closed trajectory, and
(e) means for forming an electronic image of high resolution from the stored image informations.

Modifications of the invention are subject matter of the sub-claims.

Embodiments of the invention will now be described in greater detail with reference to the accompanying drawings.

Figure 7:
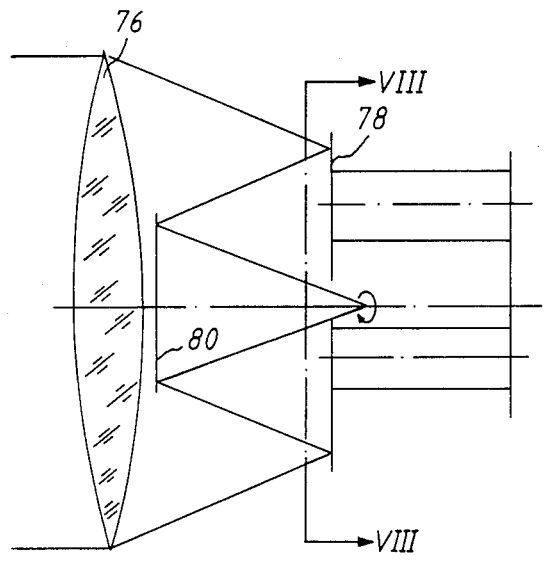
FIG. 7 shows in a schematic side elevational view the optical system, by which the field of view is imaged on the mosaic detector, with the image offset means acting on a mirror.
Figure 8:
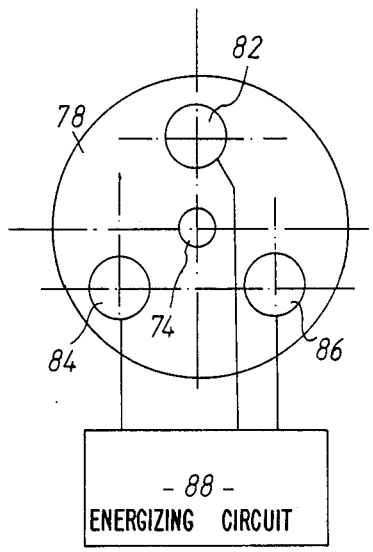

FIG. 8 in an accompanying view taken along line VIII—VIII of FIG. 7. and shows a mirror of the optical system and the angular arrangement of image offset means acting thereon.

Figure 9:
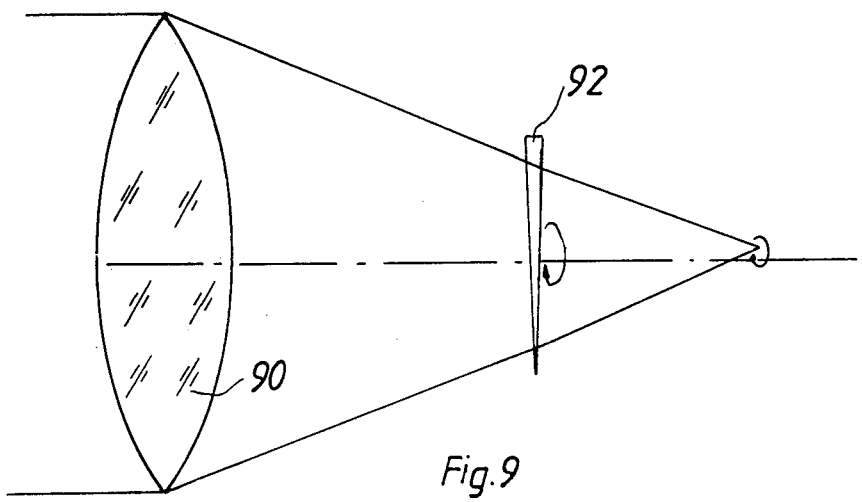

FIG. 9 shows a side elevational view of a further embodiment of an electro-optical detector system.

Figure 10:
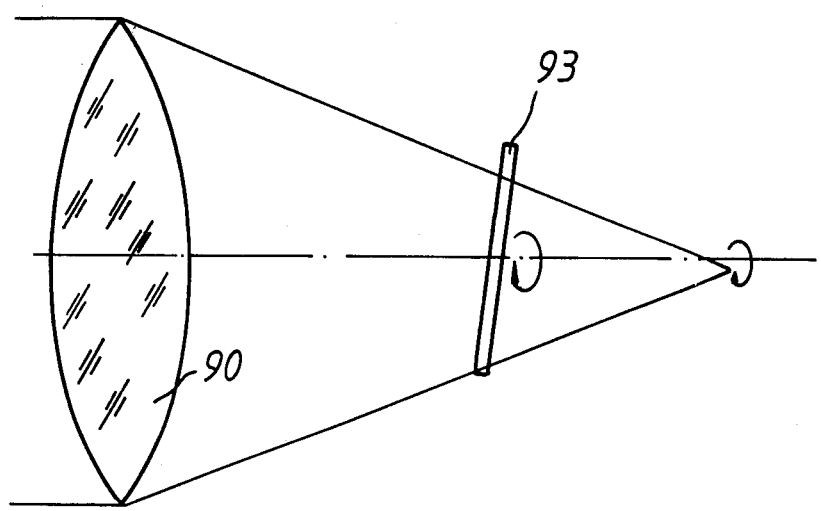

FIG. 10 shows a side elevational view of a still further embodiment of an electro-optical detector system.

Figure 1:
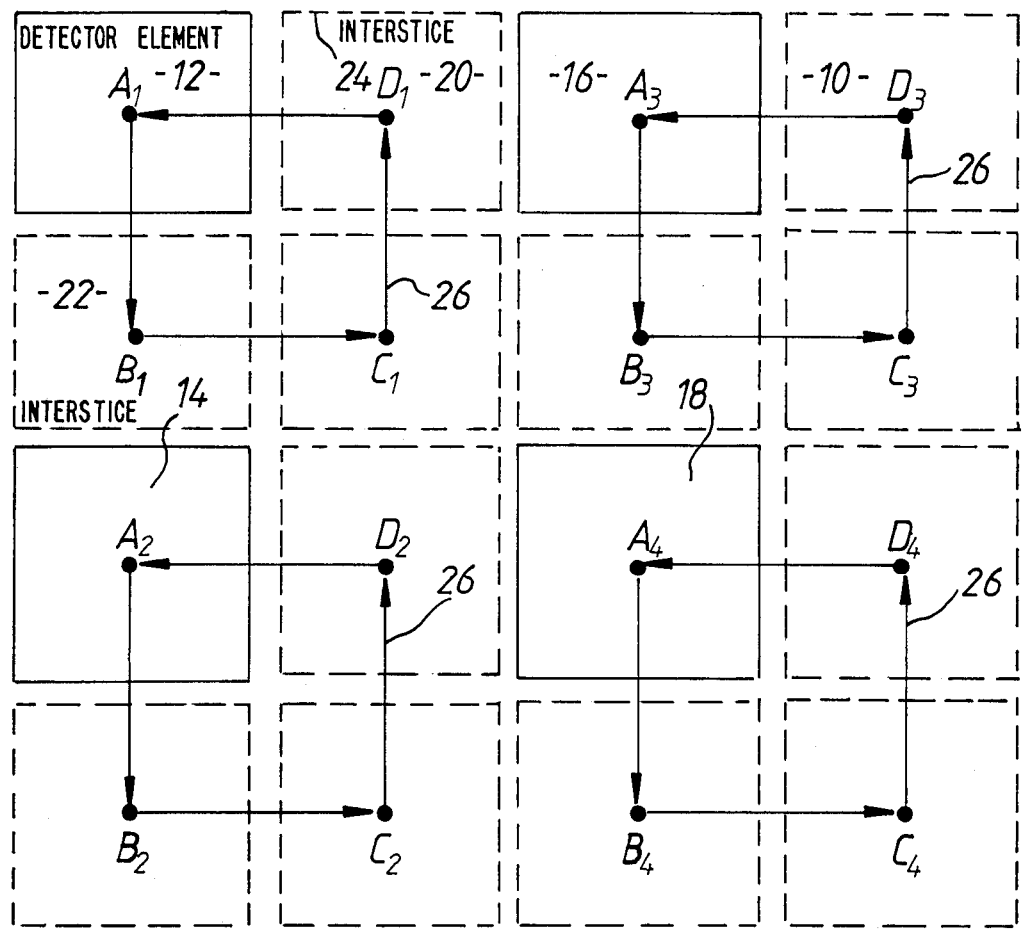
FIG. 1 shows schematically, at an enlarged scale, a section of a mosaic detector having four spaced detector elements, image elements which are imaged consecutively on a respective one of the detector elements, and the closed trajectories described by points of the image of the field of view.

A section of a mosaic detector 10 is illustrated in FIG. 1. This is a charge-coupled component, of which four detector elements 12,14,16 and 18 are illustrated. The detector elements 12,14,16,18 . . . are arranged in horizontal lines and vertical columns. Interstices 20 and 22, respectively, are formed between the lines and between the columns. In the illustrated embodiment, the widths of these interstices are substantially equal to the dimensions of the corresponding sides of the rectangular detector elements.

The field of view generated on this mosaic detector can be resolved into image elements 24 which are illustrated by dotted lines in FIG. 1, and which partly coincide with the detector elements 12,14,16,18 and partly fall on the interstices 20 and 22. The transformation of the image of the field of view into an "electronic" image by the detector elements 12,14,16,18 causes considerable loss of information in a rigid arrangement because of the interstices 20 and 22 which are technologically necessary.

Image offset means are provided to avoid this loss of information, which are adapted to displace the image of the field of view relative to the mosaic detector 10 periodically along a closed trajectory for covering the interstices 20,22. This relative displacement can be obtained by a movement of the mosaic detector. Advantageously, however, the image of the field of view is moved relative to the stationary mosaic detector 10, as will be described hereinbelow. In FIG. 1, however, movement of the detector elements 12,14,16 and 18 relative to the image elements 24 stationary in the plane of the paper is illustrated to simplify the illustration. Four image elements 24 of the image of the field of view are associated with each detector element 12,14, 16 and 18, which image elements 24 are designated by center points $A_1,B_1,C_1,D_1$; $A_2,B_2,C_2,D_2$; $A_3,B_3,C_3,D_3$ and $A_4,B_4,C_4,D_4$, respectively. The image of the field of view occupies four different positions. In the illustrated first position, detector element 12 detects the image element $A_1$, detector element 14 detects the field of view element $A_2$, detector element 16 detects the image element $A_3$ and detector element 18 detects the image element $A_4$. The detector element 12 detects the image element $B_1$ in the second position of the image of the field of view. The detector element 12 detects the image element $C_1$ in the third position of the image of the field of view, and the detector element 12 detects the image element $D_1$ in the fourth position of the image of the field of view. In a corresponding manner, the detector element 14 detects consecutively the image elements $B_2,C_2$ and $D_2$, etc. It can be seen that, in this manner, all the image elements 24 are detected by the detector elements 12,14,16,18 etc., in the progress of one cycle. Here, as mentioned, the movement of the detector elements 12,14,16,18 relative to the image of the field of view is illustrated, which follow the closed trajectories 26 counterclockwise. In fact, in the illustrated embodiment, each image element performs a movement clockwise along one closed trajectory relative to the stationary detector elements 12,14, 16,18.

The image information supplied by the detector elements 12,14,16,18, is applied to memory means, which image informations correspond to several points of the last mentioned closed trajectory. A subtantially complete image information of the field of view is stored in these memory means after each cycle. A electronic image of high resolution for the digital image processing is generated from the image informations thus stored.

Figure 4:
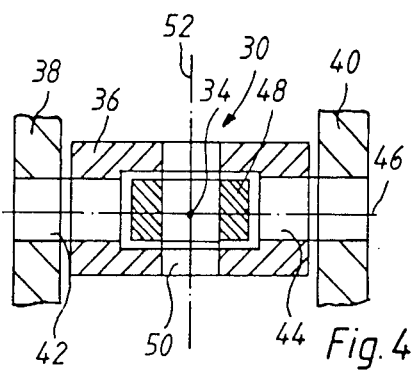
FIG. 4 shows a sectional view taken along line IV—IV of FIG. 2.
Figure 2:
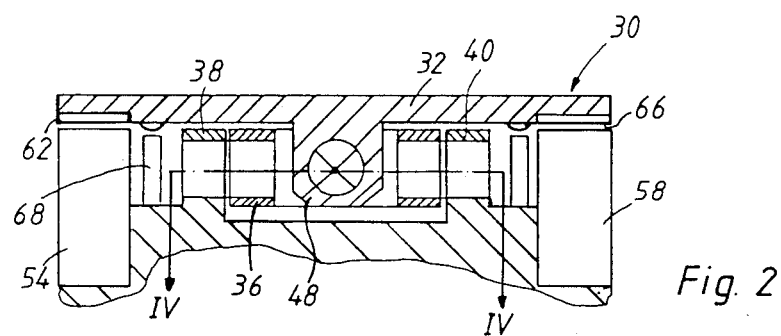
FIG. 2 shows a mirror arranged in the path of rays of an optical system imaging the field of view on the mosaic detector, and the image offset means adapted to impart to the mirror a stepwise nutating motion.
Figure 3:
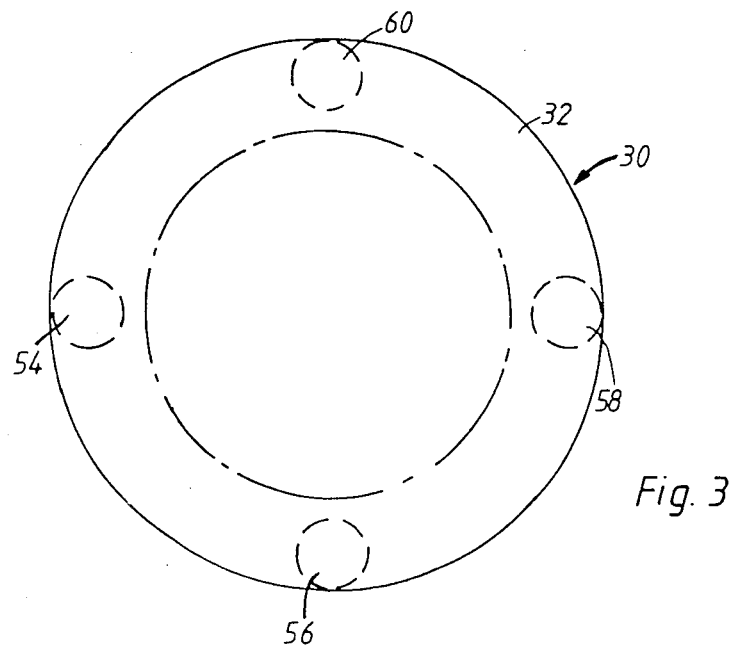
FIG. 3 shows a plan view of the mirror surface.

An embodiment of image offset means 30 is illustrated in FIGS. 2 to 4, which are adapted to periodically displace the field of view along a closed trajectory relative to the mosaic detector 10. These image offset means 30 are arranged for producing a stepwise movement of the image of the field of view along said closed trajectory. They comprise a mirror 32 arranged in the imaging optical system. The mirror 32 is suspended on gimbals and can thus be inclined to all sides about a pivotal point 34. A gimbal 36 is mounted inclinably about an axis 46 in housing-fixed bearing blocks 38,40 through two two-part flexural pivots 42 and 44. The mirror 32 is inclinably mounted with a projection 48 about an axis 52 through a three-part flexural pivot 50. The two axes 46 and 52 intersect in the pivotal point 34.

Four electromagnets 54,56,58,60 angularly offset by 90° are arranged around the pivotal point 34. Torques may be exerted on the mirror 32 by the electromagnets 54,56,58,60 to provide an inclination of the mirror 32. For this purpose, ferromagnetic armatures 62,66... are affixed to the mirror 32, opposite the magnets 54 and 58, respectively, etc. The armatures 62,66..., however, do not get into engagement with the magnets 54,56,58,60. Rather are annular stop means 68 provided on the back side of the mirror 32 around the gimbal 36 and the bearing blocks 38,40, the mirror 32 rolling during its nutating movement from one position to another.

A energizing circuit (not illustrated) is provided, which is arranged to energize consecutively one pair of adjacent electromagnets, for example 54 and 56, in each position of the mirror 32. One electromagnet, for example 56, of the last energized pair, for example 54,56, is kept energized by the energizing circuit, when changing over from one position to the next. The other electromagnet 54 of this pair, which is located on one side of the electromagnet 56 kept energized, is deenergized. The electromagnet 58 on the other side is energized with delay after this de-energization. Two electromagnets, are always energized in the stable final states. The mirror 32 is inclined toward the upper left, the lower left, the lower right or the upper right. This corresponds, for example, to the different positions of the detector element 12 relative to the image elements $A_1, B_1, C_1$ and $D_1$.

Figure 5:
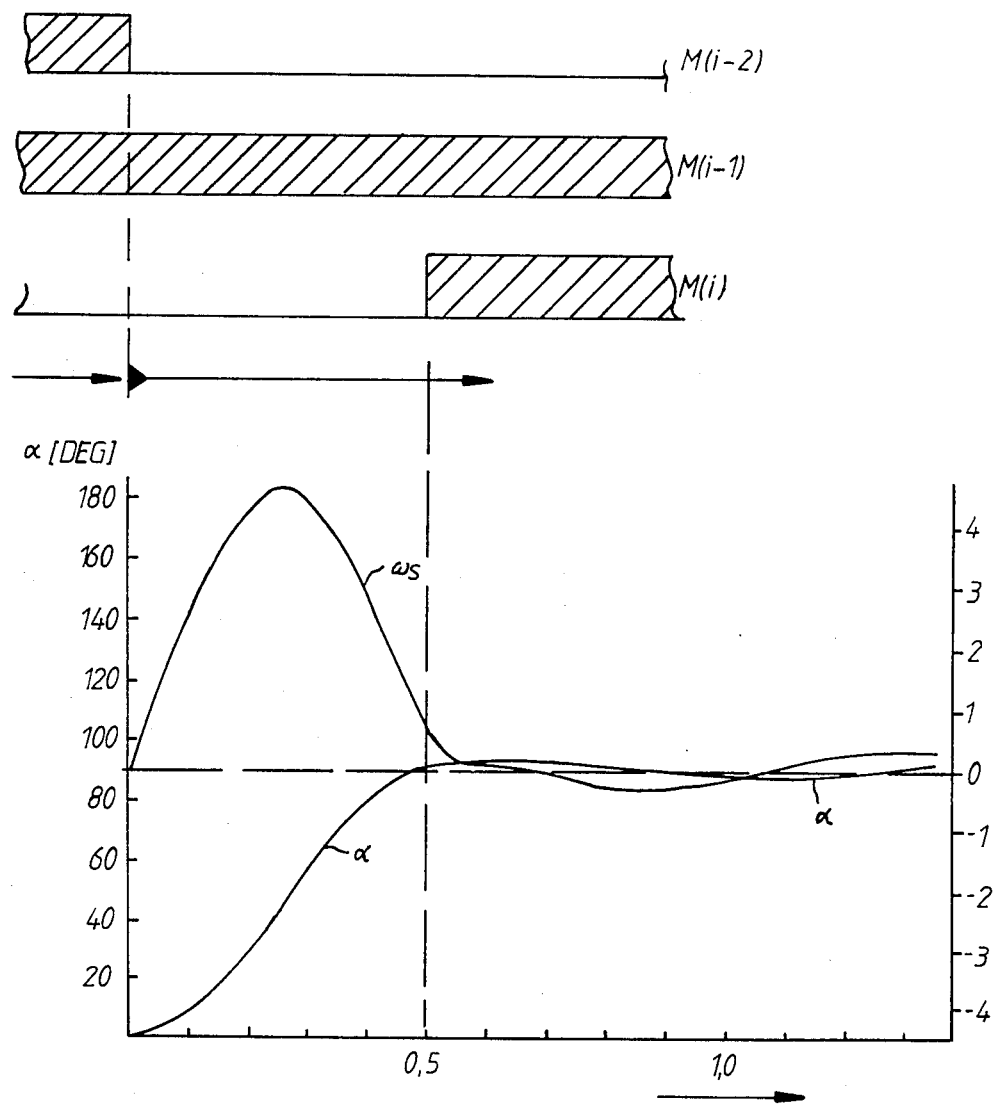
FIG. 5 illustrates the sequence of the changing over process in an arrangement according to FIGS. 2 to 4.
Figure 6:
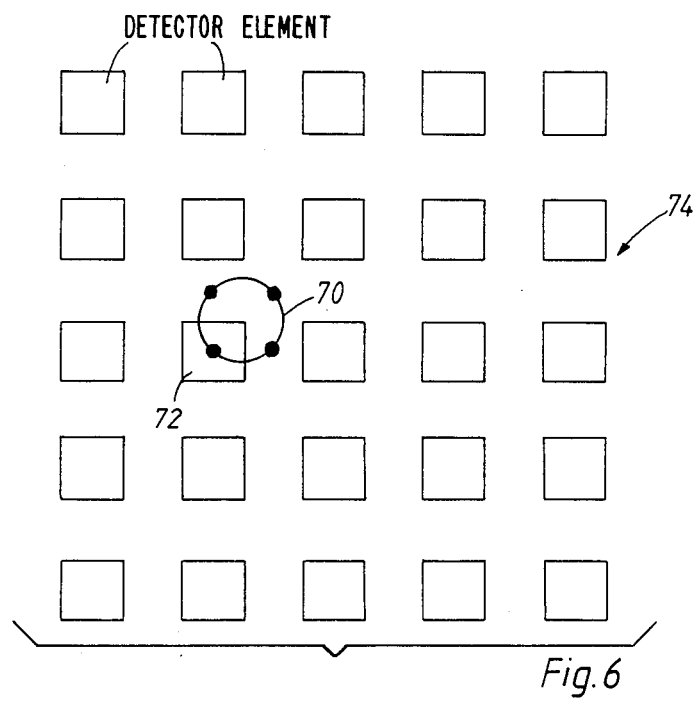
FIG. 6 shows a mosaic detector with one closed trajectory described by an image point of an image of the field of view in another embodiment of an electro-optical detector system.

The chronological sequence of the energization processes in the changing over process is illustrated in FIG. 5. The energization of the different electromagnets M (i-2), M (i-1) and M (i), that is, for example 54,56, and 58, is illustrated as function of time in the upper part, and the angular rate $\omega_s$ of the nutating mirror 32 and the nutation angle $\alpha$ are illustrated therebelow also as function of time. It can be seen that the electromagnet M (i) is not energized until the electromagnet M (i-2) has been de-energized and after a further delay of 0.5 milliseconds. By this provision and by the fact that the mirror 32 rolls on annular stop means 68 it is ensured that the mirror 32 is positioned in its new position without overshooting. The mirror 32 is moved very quickly from one position to the other (switching time) and then rests in this position for a relatively long measuring time until the advancing to the next position commences.

The energizing circuit operates according to the following scheme:

| Position | Electromagnet | | | |
| --- | --- | --- | --- | --- |
| | 54 | 56 | 58 | 60 |
| 2 | L | L* | O | O |
| 3 | O | L | L* | O |
| 4 | O | O | L | L* |
| 1 | L* | O | O | L |
| 2 | L | L* | O | O |

In this table "L*" means engerization, "O" means no energization and "L" means energization with time delay according to FIG. 5.

In the embodiment according to FIGS. 6 to 10, the image of the field of view is not advanced stepwise but moved continuously along a circular trajectory. Each image element moves along such a circular trajectory 70 relative to the associated detector element 72 of the mosaic detector 74. The detector elements 72 are rectangular in the illustrated embodiment. The widths of the interstices between the lines and the columns of the detector elements 72 are comparable to the side lengths of the detector elements 72. The diameter of the circular trajectory 70 is equal to the length of the diagonal of a detector element. The signals obtained from the detector elements 72 are integrated through the trajectory sections located between the points "1", "2","3"and "4". The integrals are stored and these four integrals are processed for forming an "electronic" image of the field of view. It is true that here a certain "blurring" of the image information occurs. But in any case, contrary to a rigid arrangement, image informations are obtained also from the interstices and used for producing the electronic image of the field of view.

In the embodiment according to FIGS. 7 and 8, the imaging optical system comprises a lense 76, an annular plane mirror 78 and a plane mirror 80. The path of rays is folded by the plane mirrors 78 and 80. The lense 76 produces an image of a field of view on the mosaic detector 74 by way of the plane mirrors 78 and 80. The plane mirror 78 is supported on three piezoelements 82,84 and 86, which are arranged around the mosaic detector 74 and angularly offset by 120°. The piezoelements 82,84 and 86 are supplied with three alternating voltages mutually displaced in phase by 120° by an energizing circuit 88. As known, the length of piezoelements varies in proportion to the applied voltage. The plane mirror 78 carries out a uniform nutating motion when three alternating voltages mutually displaced in phase by 120° are supplied to the three piezoelements angularly spaced by 120°. A controlled fine adjustment of the optical image sharpness can be achieved by superimposing a direct voltage to the alternating voltage, particularly to compensate for variations of temperature. Due to the nutating motion of the plane mirror 78, each point of the image of the field of view makes a gyrating motion along one trajectory corresponding to the trajectory 70.

FIG. 9 shows in a further embodiment how the gyrating motion of the image of the field of view can be produced. The imaging optical system is represented there by a lens 90. A rotating optical wedge 92 is arranged in the path of rays of the system, which wedge 92 effects a gyrating image offset.

FIG. 10 shows in a further embodiment how the gyrating motion of the image of the field of view can be produced. The imaging optical system is represented by a lens 90. An inclined optical plate 93 is arranged in the path of rays of the system, which plate 93 effects a gyrating image offset when rotated.

We claim:

1. Electro-optical detector system for the generation of electronic picture information, comprising:
   (a) a charge-coupled mosaic detector having a plurality of rectangular detector elements having first and second sides, said detector elements being arranged in columns parallel to said first sides and rows parallel to said second sides,
   (b) the detector elements of each of said columns defining first interstices therebetween, the widths of said intersticies being substantially equal to the lengths of said first sides,
   (c) the detector elements of each of said rows defining second interstices therebetween, the widths of said second interstices being substantially equal to the length of said second sides,
   (d) imaging means for forming an image of a field of view on said mosaic detector whereby each of said detector elements provides picture information, and
   (e) image displacement means cyclically acting on said imaging means for displacing said image relative to said mosaic detector along a closed rectangular trajectory, said image displacement means comprising means for displacing each point of said image relative to said mosaic detector, during each cycle, quickly from one corner of a rectangle, the sides of which are equal and parallel to said first and second sides, to an adjacent corner, and means for holding said image stationary between such displacements for a time interval substantially larger than the time required for each of said displacements from one corner to the next one.

2. Electro-optical detector system as set forth in claim 1, in which the image displacement means is arranged for producing a stepwise movement of the image of the field of view along said closed trajectory.

3. Electro-optical detector system as set forth in claim 1, in which the image displacement means further comprises
   (a) a gimbal suspended mirror arranged in an optical system for imaging a field of view on the mosaic detector,
   (b) four electromagnets angularly offset by 90° and arranged around a central pivotal point of said mirror, said electromagnets being adapted to exert torques on the mirror for providing an inclination of the mirror, and
   (c) means to energize consecutively one pair of adjacent electromagnets for displacing and retaining said mirror at each desired position thereof.

4. Electro-optical detector system for the generation of electronic picture information, comprising:
   (a) a charge-coupled mosaic detector having a plurality of rectangular detector elements having first and second sides, said detector elements being arranged in columns parallel to said first sides and rows parallel to said second sides,
   (b) the detector elements of each of said columns defining first interstices therebetween, the widths of said interstices being substantially equal to the lengths of said first sides;
   (c) the detector elements of each of said rows defining second interstices therebetween, the widths of said second interstices being substantially equal to length of said second sides,
   (d) imaging means for forming an image of a field of view on said mosaic detector whereby each of said detector elements provides picture information,
   (e) image displacement means cyclically acting on said imaging means for displacing said image relative to said mosaic detector along a closed rectangular trajectory, said image displacement means comprising means for displacing each point of said image relative to said mosaic detector, during each cycle, quickly from one corner of a rectangle, the sides of which are equal and parallel to said first and second sides, to an adjacent corner, and means for holding said image stationary between such displacements for a time interval substantially larger than the time required for each of said displacements from one corner to the next one, said image displacement means further including
      (i) a gimbal suspended mirror arranged in the mosaic detector,
      (ii) four electromagnets angularly offset by 90° and arranged around a central pivotal point of said mirror, said electromagnets being adapted to exert torques on the mirror for providing an inclination of the mirror, and
      (iii) means to energize consecutively one pair of adjacent electromagnets for displacing and retaining said mirror at each desired position thereof, and
   (f) annular stop means provided at the back side of the mirror, such that the mirror rolls on said stop means during its displacement from one position to another.

5. Electro-optical detector system as set forth in claim 4, in which said means to energize, when displacing said mirror from one position to the next, keeps one electromagnet of a previously energized pair energized, while the other electromagnet of this pair, which is located on one side of said one electromagnet, is de-energized, and the electromagnet on the other side of said one electromagnet is energized with delay after this de-energization.

* * * * *